Oct. 26, 1926.
G. N. HEIN
SURGICAL INSTRUMENT
Filed May 4, 1925
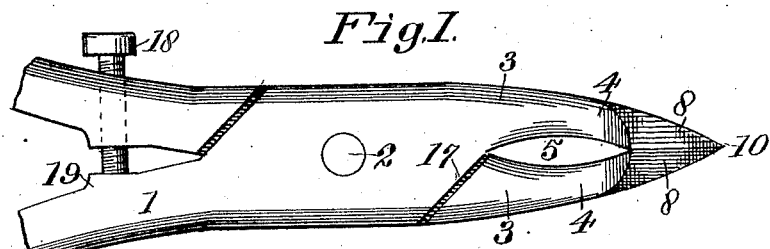
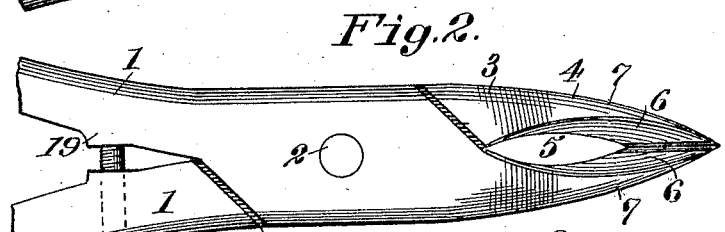
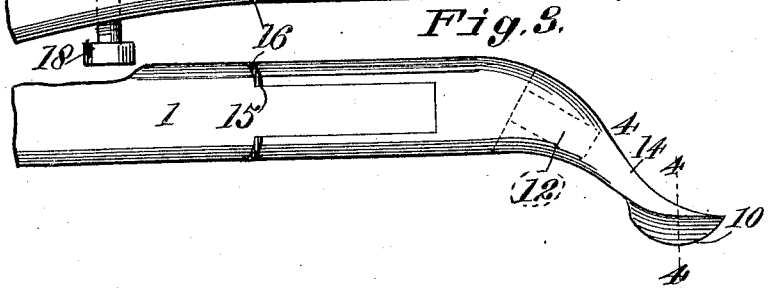
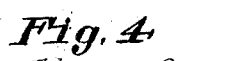
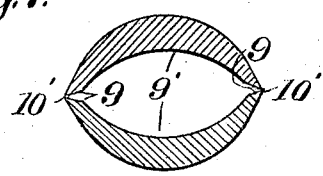
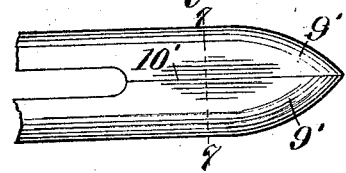
Inventor.
George N. Hein
Harry H. Totten
By           Attorney.

Patented Oct. 26, 1926.

1,604,695

UNITED STATES PATENT OFFICE.

GEORGE N. HEIN, OF SAN FRANCISCO, CALIFORNIA.

SURGICAL INSTRUMENT.

Application filed May 4, 1925. Serial No. 27,879½.

The present invention relates to a surgical apparatus preferably in the form of a hand instrument of the pincer type particularly designed for the cutting, without crushing or splintering of projecting bone surfaces, or for the cutting into of relatively flat bone surfaces without splintering or crushing the main bone portion, the latter use being advantageous when it is desirable to remove a portion of bone below a relatively flat bone surface. The invention is designed particularly to make a clean shearing or cutting action into a relatively flat bone surface in contradistinction to the scraping action on the surface thereof, and is further designed to cut a projecting bone surface without liability of crushing or splintering the major portion or remaining bone body. An object of the invention is to provide a plurality of sets of variously shaped cutting jaw members each capable of performing the above function under different conditions, and each set of jaw members carried by individual handle members, or each set of jaw members adapted for removable interchanging on a suitable princer-like handle or body. The invention consists in providing with a pair of crossed pivotally connected handles, a pair of cutting jaws having parallel opposing cutting edges, the latter being formed with opposing cutting bevels designed for contacting with the outer face or surface of the jaws at the contacting point of the bevels receding from the cutting edge at an angle.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein:—

Fig. 1 is a view in bottom plan of one embodiment of my invention with the pincers or forcep handles broken away.

Fig. 2 is a view in top plan of the structure illustrated in Fig. 1.

Fig. 3 is a view in side elevation of a structure similar to those in Figs. 1 and 2, provided with cutting jaw members illustrated in dotted lines as removable from the crossed handle members.

Fig. 4 is a transverse, sectional view taken on line 4—4 of Fig. 3, illustrating the use of a stone in sharpening the bevelled portions of the jaws.

Fig. 5 is a cross section through the dotted line portion of structure illustrated in Fig. 3, disclosing the interlocking slip joint connection between a releasable jaw and its support.

Fig. 6 is a view in side elevation of a double edge cutting structure, and

Fig. 7 is a transverse sectional view of the form of invention illustrated in Fig. 6.

Referring more particularly to the several views of the drawings wherein like characters of reference designate corresponding parts, 1 indicates a pair of crossed handle members formed at corresponding ends with handle portions, not shown. The members 1 are fulcrumed at their point of crossing as at 2 to form a structure of the pincer type. The ends 3 of the members 1 are, as illustrated in Figs. 1 and 2, and in the modified structure of Fig. 3, curved downwardly as at 4, and are tapered toward their free ends. In top plan, Fig. 2, the ends 3 are illustrated as curved or bowed as at 5, and the opposing surfaces of the curved portions are concaved as at 6. The material forming the ends 3 is, near its end, tapered in cross section from its upper edge 7 to its lower edge 8, the latter edges, which are disposed to interengage or contact, are bevelled at 9 to provide sharp cutting edges 10, Fig. 4. In side elevation, the cutting edges 10 may be of any desirable corresponding shape dependent on the particular work to be performed by the instrument, the form illustrated in Figs. 1 and 2 being a relatively straight cutting edge, and that indicated at 10 in Fig. 3 being an arcuately and downwardly curved edge designed for a particular purpose.

As illustrated in Fig. 4, the cutting edges 10 may be sharpened by the employment of a suitably shaped stone 11 with walls bevelled corresponding to the bevel 9 and imparting to the stone a reciprocating movement longitudinally of the cutting edges.

In Figs. 6 and 7, a tool having a continuous cutting edge at its sides and ends is illustrated, the same consisting of a pair of substantially spoon-shaped blades 9', the opposite edges of which are adapted to contact and are formed with continuous cutting bevels 10', the construction resembling a duck bill in elevation and cross section. This structure consists in a duplication of cutting edges illustrated in Fig. 4 by carrying out the curvature of the walls of the cutting members so that their opposing edges will interengage and provide an oval body as illustrated in Fig. 7. The structure illustrated in Figs. 6 and 7 is particularly designed for side cutting use, and for operation by either the right or left hand.

As indicated in dotted lines, Fig. 3, and full lines Fig. 5, the cutting elements can be constructed for removal from the ends of the crossed handle portions, and one form of connection is constructed as follows:— The free ends of the crossed handles terminate abruptly into extensions 12 substantially T-shaped in cross section, these being received within corresponding recesses formed longitudinally in the shank portions 13 of removable cutting blades 14.

It will be observed in the cross sections, Figs. 4 and 7, that the outer surface or face of the cutting members recede from each other at a point beginning at the cutting edge 10 at an acute angle, and are also disposed at an acute angle to the bevel 9, Fig. 4, and 10' Fig. 7. This construction provides a cutting instrument adapted for use by positioning the cutting edges of the blades thereof on the face of a relatively flat surface, and with slight pressure downwardly on the cutting edges on the movement of the handles together to cut or remove a section from the surface corresponding to the blade area of the two.

The crossed handles 1 are diagonally cut inwardly at their point of crossing approximately one half of their thickness as at 15 with the length of one cut greater than the other, enabling the cut portions to be centered providing a space 16 between the diagonal end walls 17 when the cutting edges 10 are in contact. The space 16 enables the cutting edges to be ground or sharpened without in any manner interfering with their closing. To prevent injury to the cutting edges by their contacting an adjustable limiting screw 18 may be provided in one handle for abutting against a stop face 19 formed on the other handle.

I claim:—

1. A surgical instrument including a pair of pivotally connected crossed handles formed at corresponding ends with cooperating cutting jaws, the cooperating cutting jaw edges being inwardly bevelled from the outer face of the jaw to provide a cutting edge, said cutting edges opposing each other in edge to edge relation, and the outer face of the jaws receding angularly from each other.

2. A surgical instrument including a pair of pivotally connected crossed handles formed at corresponding ends with cooperating cutting jaws, the cooperating cutting jaw edges being inwardly bevelled from the outer face of the jaw to provide a cutting edge, said cutting edges opposing each other in edge to edge relation, and the outer face of the jaws adjacent to the respective cutting edges being substantially straight and receding from each other at an angle.

3. A surgical instrument including a pair of pivotally connected crossed handles each formed at one end with an elongated cutting jaw having parallel jaw edges extending upwardly from one face of the jaw and united at corresponding ends by a curved jaw edge also extending upwardly from one face of the jaw, said cutting edges being inwardly bevelled from the outer face of the jaw to provide a cutting edge, said cutting edges of the respective jaws opposing each other in edge to edge relation, and the outer face of the jaws receding angularly from each other.

4. A medical appliance including a pair of crossed handles, the respective handle members at their point of crossing being diagonally cut inwardly approximately one half of their thickness, the length of the cut of one member being slightly greater than that of the other, a pivoted connection uniting the handles at their point of crossing with the end walls of one cut portion spaced from the end walls of the other portion, cutting edges opposing each other at corresponding ends of the handles, said jaw edges being inwardly bevelled from the outer face of the jaw and the outer face of said jaws being substantially straight and receding from each other at an angle.

5. A surgical instrument including a pair of co-operating cutting jaws, the cutting jaw edges being inwardly bevelled from the outer face of the jaw to provide a cutting edge and the outer face of the jaws receding angularly from each other at approximately a 45 degree angle, and a pair of pivotally connected crossed handles to which said cutting jaws are removably connected.

6. A surgical instrument including a pair of co-operating cutting jaws, the cutting jaw edges being inwardly bevelled from the outer face of the jaw to provide a cutting edge and the outer face of the jaws receding angularly from each other at approximately a 45 degree angle, a pair of pivotally connected crossed handles to which said cutting jaws are removably connected, and adjustable means co-operating with the crossed handles to limit the movement of said jaws toward each other.

In testimony whereof I have signed my name to this specification.

GEORGE N. HEIN.